D. T. WALLACE.
NUT LOCK.
APPLICATION FILED AUG. 23, 1909.
1,178,041.
Patented Apr. 4, 1916.
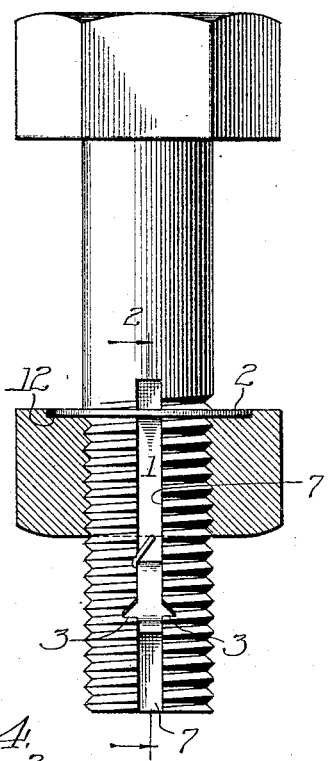
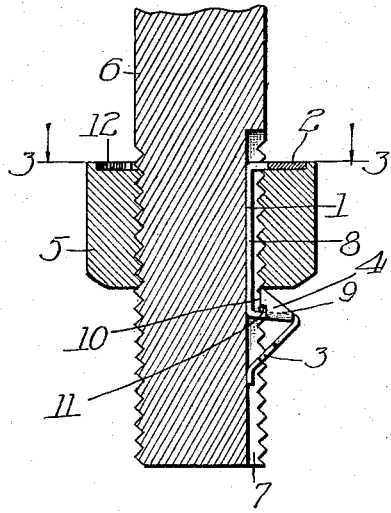
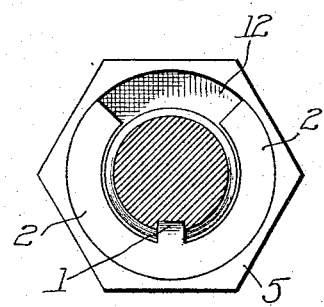
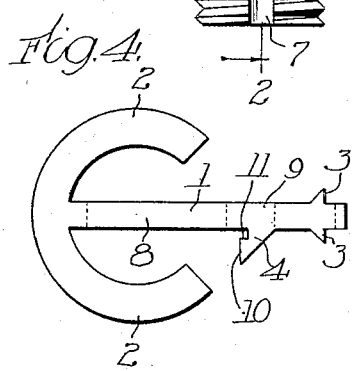
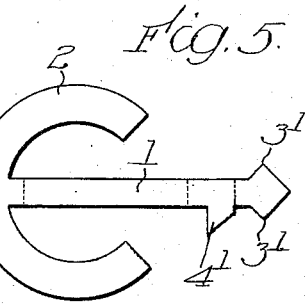
Witnesses:
Robert H. Weir
Blanche Chalmers.
Inventor:
David T. Wallace
By Burton Wells
Atty.

UNITED STATES PATENT OFFICE.

DAVID T. WALLACE, OF CHICAGO, ILLINOIS, ASSIGNOR OF ONE-THIRD TO FRANK M. HOOD, OF PARK RIDGE, ILLINOIS.

NUT-LOCK.

1,178,041. Specification of Letters Patent. Patented Apr. 4, 1916.

Application filed August 23, 1909. Serial No. 514,212.

*To all whom it may concern:*

Be it known that I, DAVID T. WALLACE, a citizen of the United States, residing at Chicago, in the county of Cook and State of Illinois, have invented certain new and useful Improvements in Nut-Locks, of which the following is a description.

My improvement relates to means for securing a nut in position upon a bolt to prevent its accidental displacement in service.

The object of my invention is to provide a simple durable, efficient and reliable device of the kind described.

To this end my invention consists in the novel construction, arrangement and combination of parts herein shown and described, and more particularly pointed out in the claims.

In the accompanying drawings wherein like or similar reference characters indicate like or corresponding parts: Figure 1, is a side elevation of my device in operative relation upon a bolt with the nut partly broken away to more clearly show the construction. Fig. 2, is a section taken substantially on line 2—2 of Fig. 1. Fig. 3, is a section taken substantially on line 3—3 of Fig. 2. Fig. 4, is a plan view of a properly formed blank before the same is bent into operative form. Fig. 5 is a view similar to Fig. 4, but showing a slightly modified form of my device.

In the preferred form shown in the drawings, my device consists of a single piece cut or otherwise formed, of sheet steel or other suitable material and comprises a substantially straight shank or stem 1, of uniform width provided with a pair of curved arms 2—2 at one end, a pair of small wings or lugs 3—3 near its opposite end, and a prong or spur 4 upon the intermediate portion of the shank 1 near the wings 3. The arms 2—2 are preferably of substantially uniform width and length and are evenly curved edgewise to jointly form a part of a circular band adapted to coöperate with the nut 5 which it is desired to lock in position upon the bolt 6 to serve as a washer or bearing between the nut and the material which the bolt is employed to secure in position.

The nut and bolt may be of the usual or any preferred form or construction with a suitable recess or channel formed between them to receive the shank 1 of my device.

As shown a longitudinal slot or groove 7 is formed in the wall of the bolt of sufficient width to receive the shank 1 and permit its free longitudinal movement. In this form the shank 1 extends radially of the arms 2—2 a sufficient distance to enter the slot 7 and is then bent at substantially right angles to the plane of the arms. Thence the part 8 of the shank extends to a point near the prong 4 where it is again bent at substantially right angles bringing the part 9 of the shank to which the prong 4 is attached substantially parallel to the plane of the arms 2—2 and extending outward from the bolt. Near the outer edge of the prong 4 the shank 1 is again bent toward the bolt at a suitable angle to bring the outer faces of the wings 3—3 into engagement with the threads of the bolt to serve as a brace to prevent straightening of the shank 1 in service. The extremity of the shank beyond the wings 3 extends into the slot 7 where if desired it may be bent to extend longitudinally of the slot to secure a suitable bearing against the walls of the slot to assist in supporting the part 9. As shown in Fig. 2, the prong 4 is preferably bent toward the arms 2—2 slightly beyond the side of the shank 1 and the distance between the arms 2 and the extremity of the prong 4 is slightly less than the thickness of the part of the nut with which it is to coöperate so that when the arms 2—2 are in contact with the working face of the nut the extremity of the prong 4 will resiliently engage its back face thereby locking the nut against rotation in one direction.

In the preferred construction shown a part 10 is provided upon the prong 4 adapted to project into the slot 7 when my device is in operative position, so arranged that a shoulder 11 is in position to engage the wall of the slot to prevent buckling or distortion of my device in case considerable force is employed to turn the nut against the holding action of my device. As shown also a recess 12 is provided in the face of the nut adapted to receive the arms 2—2 and thereby jointly provide a substantially flat bearing surface at the working face of the nut.

In the form shown in Fig. 5 the end of the shank 1 is beveled or pointed from the extremities of the wings 3'—3' to the center line of the shank so that when this beveled or pointed end which normally rests against the walls of the slot 7 is forced toward the slot by the engagement of the prong 4 with the back face of the nut, it will tend to adjust itself in the slot so as to engage the adjacent threads of the bolt on each side of the slot with substantially the same pressure. Otherwise the form and operation of this form of my device is substantially the same as hereinbefore described.

Having thus described my improvement it is obvious that various immaterial modifications within the scope of the appended claims may be made in my device without departing from the spirit of my invention.

What I claim as new and desire to secure by Letters Patent is:

1. In a device of the kind described, a threaded bolt and a nut having a recess formed in one face coöperating with said bolt, in combination with a washer, a shank upon said washer adapted to extend into the central opening of said nut and engage said bolt to prevent rotation of the washer upon the bolt and a part upon said shank positioned at an angle to and adapted to engage at any point in a substantially plain surface upon said nut to prevent rotation of the nut upon the bolt in one direction.

2. In a device of the kind described, a threaded bolt and a nut having a recess formed in one face coöperating with said bolt, in combination with a washer, a shank upon said washer adapted to extend into the central opening of said nut and engage said bolt to prevent rotation of the washer upon the bolt, and a part upon said shank positioned at an angle to, and pressing against one face of said nut and adapted to coöperate with said washer to clamp said nut between said part and said washer to prevent rotation of the nut upon the bolt in one direction.

3. In a device of the kind described, a threaded bolt and a nut having a recess formed in one face coöperating with said bolt, in combination with a washer, a shank upon said washer adapted to extend into the central opening of said nut and engage said bolt to prevent rotation of the washer upon the bolt, means upon the shank adapted to engage the bolt and prevent longitudinal movement of said washer upon the bolt, a part near the free end of the shank adapted to press against the nut and automatically engage a substantially plain surface of the same at any point to prevent rotation of the nut upon the bolt in one direction.

4. In a device of the kind described, a threaded bolt and a nut having a recess formed in one face coöperating with said bolt, in combination with a washer, a shank upon said washer adapted to extend into the central opening of said nut and means at the free end of said shank adapted to engage said bolt and coöperate with the shank to prevent both longitudinal movement and rotation of said washer upon the bolt and a part intermediate the ends of said shank adapted to press against the nut and prevent rotation of the nut upon the bolt in one direction.

5. In a device of the kind described, a threaded bolt and a nut having a recess formed in one face coöperating with said bolt, in combination with a washer, a shank upon said washer adapted to extend into the central opening of said nut and means at the free end of said shank adapted to engage said bolt and coöperate with said shank to prevent the rotation of the washer upon the bolt and a part intermediate the ends of said shank positioned at an angle to, and pressing against a substantially plain surface of the nut at any point and adapted to prevent rotation of the nut upon the bolt in one direction.

6. In a device of the kind described, a threaded bolt and a nut having a recess formed in one face coöperating with said bolt, in combination with a washer, a shank upon said washer adapted to extend into the central opening of said nut and engage said bolt to prevent both longitudinal movement and rotation of the washer upon the bolt and a part near the free end of said shank positioned at an angle to, and pressing against said nut and adapted to coöperate with said washer to clamp said nut between said angular part and said washer to prevent rotation of the nut upon the bolt in one direction.

7. In a device of the kind described, a threaded bolt provided with a longitudinal slot and a nut coöperating with said bolt, in combination with a washer provided with a shank positioned in and engaging the slot in said bolt to prevent rotation of the washer upon the bolt and extending through and engaging the opposite face of said nut at any point to prevent rotation of the nut in one direction.

8. In a device of the kind described, a threaded bolt provided with a longitudinal slot and a nut coöperating with said bolt, in combination with a washer provided with means positioned in and engaging the slot to prevent its rotation upon the bolt and a part formed to resiliently engage the outer face of said nut at any point to prevent rotation of the nut in one direction.

9. A nut-lock comprising a washer provided with a shank adapted to extend into the central opening of a nut and to engage a recess in a threaded bolt coöperating with said nut to prevent rotation of the washer upon the bolt, in combination with a part upon the shank adapted to press against the nut and engage a substantially plain surface of the nut at any point and prevent its rotation upon the bolt in one direction only.

10. A nut-lock comprising a washer provided with a shank adapted to extend into the central opening of a nut and engage a recess in the threaded bolt coöperating with the nut to prevent both longitudinal movement and rotation between the bolt and washer, in combination with a part upon the shank adapted to press against and engage said nut and coöperate with said washer to clamp said nut between said part and said washer to prevent its rotation upon the bolt in one direction only.

11. A nut-lock comprising a washer provided with means adapted to engage a threaded bolt to prevent its rotation upon the bolt, in combination with means resiliently engaging the outer face of a nut coöperating with said bolt at any point to prevent rotation of the nut in one direction.

In testimony whereof, I have hereunto signed my name in the presence of two subscribing witnesses.

DAVID T. WALLACE.

Witnesses:
BLANCHE CHALMERS,
BURTON U. HILLS.

Copies of this patent may be obtained for five cents each, by addressing the "Commissioner of Patents, Washington, D. C."